(No Model.)
A. C. FELTON.
FURNACE.
No. 253,192. Patented Feb. 7, 1882.
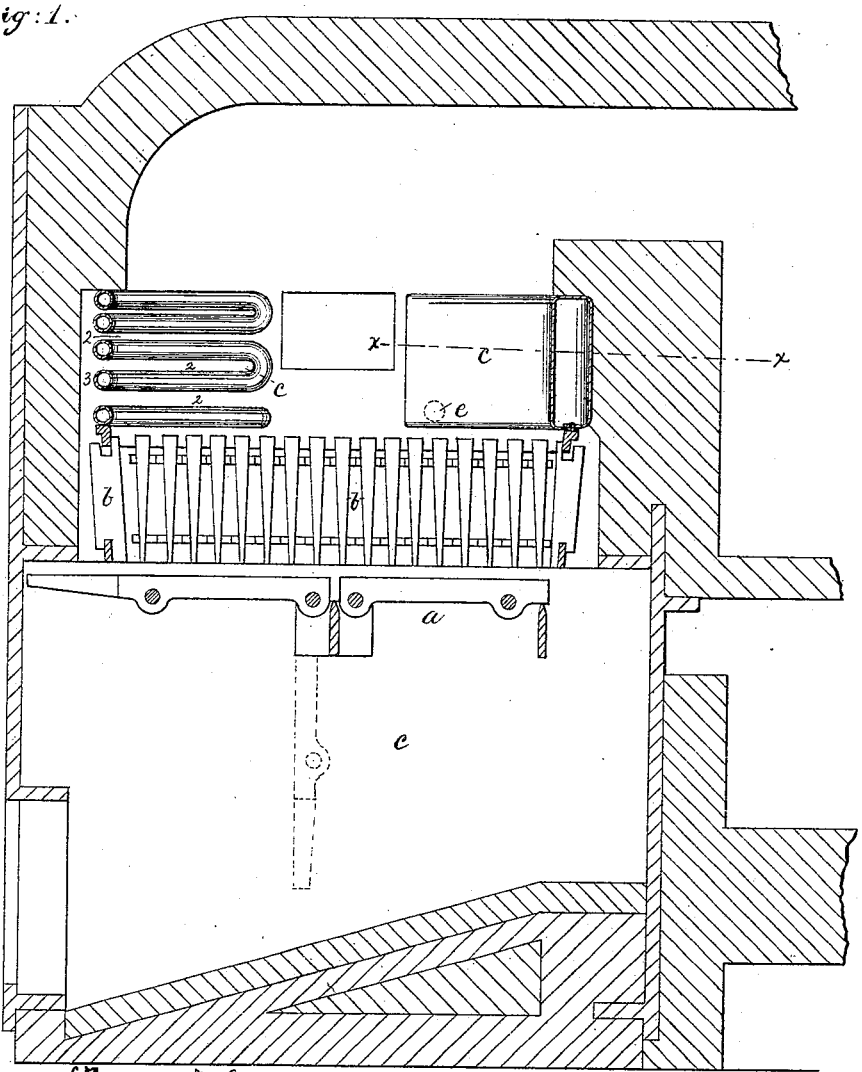
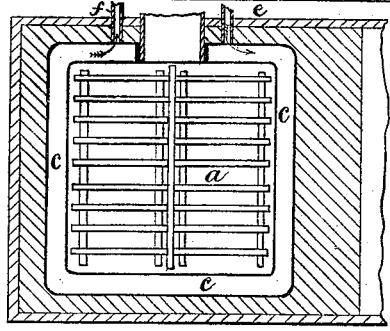
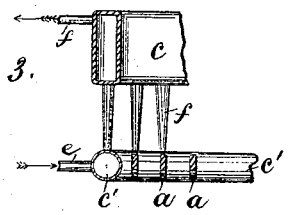
Witnesses.
G. F. Connor
Jos. F. L. Bremlot
Inventor.
Alexander C. Felton
by Crosby & Gregory Attys

UNITED STATES PATENT OFFICE.

ALEXANDER C. FELTON, OF WARWICK, MASSACHUSETTS.

FURNACE.

SPECIFICATION forming part of Letters Patent No. 253,192, dated February 7, 1882.

Application filed May 26, 1881. (No model.)

*To all whom it may concern:*

Be it known that I, ALEXANDER C. FELTON, of Warwick, county of Franklin, State of Massachusetts, have invented an Improvement in Furnaces, of which the following description, in connection with the accompanying drawings, is a specification.

This invention relates to furnaces, and has the same general structure and object as the one described in my former application filed August 25, 1880, to which reference may be had. In that application a furnace was shown having a horizontal bottom or floor grating with upright gratings at its sides, and the refractory lining of the furnace above the said upright gratings was inclined toward the middle of the furnace to reduce the pressure of the fuel against it, the main object being to prevent the formation of clinkers in the furnace and the adhesion thereof to its walls. In another application filed herewith I have shown bottom and upright gratings substantially as in my former application; but the refractory lining of the furnace above them is provided with air-passages to keep it cool, and to thus prevent the formation of clinkers thereon. In my present invention the upper part of the lining of the furnace, above the upright grating, is made as a water-back, a constant circulation of water being kept up therein, and the walls of the furnace are thus kept cool and clinkers effectually prevented from forming. The water-back may be made either as a continuous chamber surrounding the fire-chamber and lining the furnace where exposed to the action of the fuel, or it may consist of a series of horizontal pipes surrounding the furnace above the upright grating, and having an air-space behind them and spaces between them for the passage of air into the fire, and instead of the vertical or upright grate-bars, tubes may be employed at the sides of the fire-chamber connected with the main water-back and arranged for the circulation of water through them.

Figure 1 shows a longitudinal section of a furnace provided with my invention, different forms of water-back being shown at different sides of the furnace; Fig. 2, a horizontal section thereof on line $x$ $x$, Fig. 1, on a smaller scale; and Fig. 3 is a detail illustrating a modification thereof.

The general construction of the furnace with its bottom grating, $a$, upright gratings $b$ at the sides thereof, and the ash-pit below, may be as in either of my former applications, they being shown as in the one filed herewith.

Above the vertical grating $b$, in place of the refractory lining shown in my former applications, a water-back, $c$, is supported in the masonry of the furnace, it having an inlet-tube, $e$, for cold water at one end and an outlet-tube, $f$, at the other end, the water being caused to traverse the entire length of the water-back. One of these tubes will usually be connected with a boiler located above the furnace and heated by the products of combustion escaping therefrom, such arrangement being now common in works for smelting and treating ores, the steam generated in the said boilers being employed for actuating the machinery of the works.

The feed-water for the boilers may pass through the water-back $c$ on its way to the boiler, or the pipes $d$ $e$ may be connected with the boiler and properly arranged to insure circulation in the said water-back.

In one portion of Fig. 1 the water-back is shown as consisting of a series of pipes, spaces 2 being left between the said pipes for the admission of air to the furnace, and with this construction the water-back may be extended down to the horizontal or floor grating, the upright grating being dispensed with, and air-spaces 3 would then be left behind the pipes, between them and the masonry of the furnace, and the spaces between the pipes would be made narrower in the upper part of the furnace to admit a gradually-decreasing supply of air toward the top of the fire, as described in my other application in connection with the upright gratings.

In some instances it will be desirable to combine the water-back and vertical grating, as shown in Fig. 3, a series of pipes, $f$, connecting an upper chamber, surrounding the upper portion of the fire-chamber, with a lower chamber, $c'$, located at or near the edge of the floor-grating. In this construction the said pipes $f$ will be preferably larger at their upper than at their lower end to control the admission of air in a similar manner to the tapering grate $b$, as shown in Fig. 1.

I claim—

1. In a furnace, the combination, with the floor or bottom grating and vertical gratings extended upward therefrom, of a water-back surrounding the fire-chamber above the said vertical gratings, substantially as and for the purpose described.

2. The combination, with the bottom or floor grating, of the water-back consisting of a series of horizontal tubes surrounding the furnace, and a continuous chamber connected with the upper ends thereof, spaces being left behind and between the said pipes for the admission of air to the fuel, substantially as and for the purpose described.

3. In a furnace, the combination, with the bottom or floor grating, of a water-back consisting of a series of tubes surrounding or lining the wall of the furnace at the sides of the said grating, and provided with air-spaces between them gradually diminishing in size toward the upper part of the furnace, substantially as described.

In testimony whereof I have signed my name to this specification in the presence of two subscribing witnesses.

ALEXANDER C. FELTON.

Witnesses:
JOS. P. LIVERMORE,
W. H. SIGSTON.